US010402855B2

(12) United States Patent
Tsukamoto et al.

(10) Patent No.: US 10,402,855 B2
(45) Date of Patent: Sep. 3, 2019

(54) ADVERTISEMENT DISTRIBUTION DEVICE AND ADVERTISEMENT DISTRIBUTION METHOD

(71) Applicant: YAHOO JAPAN CORPORATION, Tokyo (JP)

(72) Inventors: Koji Tsukamoto, Tokyo (JP); Manabu Sassano, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 854 days.

(21) Appl. No.: 14/176,634

(22) Filed: Feb. 10, 2014

(65) Prior Publication Data

US 2014/0289039 A1 Sep. 25, 2014

(30) Foreign Application Priority Data

Mar. 22, 2013 (JP) ................................ 2013-060622

(51) Int. Cl.
*G06Q 30/00* (2012.01)
*G06Q 30/02* (2012.01)

(52) U.S. Cl.
CPC ................................ *G06Q 30/0249* (2013.01)

(58) Field of Classification Search
CPC .................................................. G06Q 30/0249
USPC ....................................................... 705/14.48
See application file for complete search history.

(56) References Cited

U.S. PATENT DOCUMENTS 8,370,197 B2 * 2/2013 Axe ....................... G06Q 30/02 705/14.4
8,700,452 B1 * 4/2014 McKennon ............ G06Q 30/02 705/14.1
2007/0027761 A1 * 2/2007 Collins .............. G06F 17/2785 705/14.58

FOREIGN PATENT DOCUMENTS

JP 2010039095 A 2/2010
JP 2010191963 A 9/2010
JP 2011060252 A 3/2011
JP A-2011-90353 5/2011
JP 2012003677 A 1/2012

OTHER PUBLICATIONS

Cognition—From Memory to Creativity, Weisberg, Reeves, 2013, John Wiley & Sons, pp. 13-40, 519-527.*
Microsoft Computer Dictionary, Fifth Edition, 2002, Microsoft Press, p. 23.*
Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*
Language and Mind, Chomsky, Oxford University Press, 2005, p. 62.*

(Continued)

*Primary Examiner* — Matthew T Sittner
*Assistant Examiner* — Michael I Ezewoko
(74) *Attorney, Agent, or Firm* — Oliff PLC

(57) ABSTRACT

An advertisement distribution device according to the present application includes a distribution unit. The distribution unit distributes advertising content while switching an advertisement distribution process in accordance with a predetermined target figure within the range an advertisement listing fee paid to a provider of a Web page on which (Continued)

the advertising content is placed reaches the predetermined target figure.

9 Claims, 9 Drawing Sheets

(56) References Cited

OTHER PUBLICATIONS

Computing the Mind, Shimon Edelman, Oxford University Press, 2008, pp. 26-31.*
Noetics, Lawrence Krader, 2010, Peter Lang Publishing, pp. 551-553.*
Britannica Concise Encyclopedia, Encyclopedia Britannica, 2006, p. 537.*
Explaining Creativity, Keith Sawyer, 2006, Oxford University Press, pp. 104-105.*
The Way We Think, Fauconnier, 2010, Persues Books Group, Chapter 1, Chapter 13.*
Creativity and Artificial Intelligence, Francisco Camara Pereira, Mouton de Gruyter, 2007, pp. 51-62.*
Mental Spaces, Gilles Fauconnier, Cambridge University Press, 1998, pp. xxviii-xxix.*
HCI remixed : reflections on works that have influenced the HCI community, MIT Press, 2008: pp. 275-279.*
Algorithms + Data Structures = Programs, Wirth, Prentice Hall, 1976, pp. xii-55.*
Why a Diagram is (Sometimes) Worth Ten Thousand Words, Larkin, Simon, Cognitive Science, 1987, pp. 65-100.*
Streetlights and Shadows, MIT Press, 2009, pp. 33-47.*
The future of the internet—and how to stop It, Yale University Press, 2008, Chapter(s) 1-9, [emphasis pp. 11-18].*
Jan. 13, 2015 Office Action issued in Japanese Application No. 2013-060622.
Sep. 1, 2015 Office Action issued in Japanese Patent Application No. 2013-060622.

* cited by examiner

| ADVERTISER ID | ADVERTISING CONTENT | BID PRICE | KEYWORD | ... |
|---|---|---|---|---|
| A10 | C11 | 100 | K11 | ... |
| | C12 | 200 | K12 | ... |
| | C13 | 150 | K13 | ... |
| | C14 | 100 | K14 | ... |
| | C15 | 100 | K15 | ... |
| | ... | ... | ... | ... |
| A20 | C21 | 50 | K21 | ... |
| | C22 | 100 | K22 | ... |
| | ... | ... | ... | ... |
| ... | ... | ... | ... | ... |

| PROVIDER ID | TARGET SALES AMOUNT [PER MONTH] | CURRENT SALES AMOUNT | DISTRIBUTION MODE | ... |
|---|---|---|---|---|
| W10 | P10 | p11 | SALES-ORIENTED | ... |
| W20 | P20 | p21 | VALUE-ORIENTED | ... |
| ... | ... | ... | ... | ... |

ADVERTISEMENT DISTRIBUTION DEVICE AND ADVERTISEMENT DISTRIBUTION METHOD

CROSS-REFERENCE TO RELATED APPLICATIONS

The present application claims priority to and incorporates by reference the entire contents of Japanese Patent Application No. 2013-060622 filed in Japan on Mar. 22, 2013.

BACKGROUND OF THE INVENTION

1. Field of the Invention

The present invention relates to an advertisement distribution device and an advertisement distribution method.

2. Description of the Related Art

As the Internet is rapidly becoming widespread in recent years, it has become popular to distribute advertisements through the Internet. For example, an advertisement is distributed by displaying advertising content (such as an icon of an image) of a company or a product at a predetermined position on a Web page and transitioning to a Web page of an advertiser when the advertising content is clicked.

Such advertising content is often distributed by an advertisement distribution device which holds advertising content submitted from each advertiser. For example, the advertisement distribution device is known to distribute an advertisement by: a method of selectively distributing advertising content with a high bid price specified by an advertiser; a method of selectively distributing advertising content that matches a keyword included in a Web page browsed by a user; and a method of selectively distributing advertising content that matches a user attribute (such as a psychographic attribute or a demographic attribute).

An advertisement distributor who is an administrator or the like of the advertisement distribution device charges an advertiser for an advertising fee based on a bid price, when the advertising content distributed in the aforementioned manner is displayed on a Web page or clicked on the Web page. Then, the advertisement distributor often pays a part or all of the advertising fee obtained from the advertiser to a Web page provider who provides the Web page as an advertisement listing fee.

However, it has been difficult in the aforementioned related art to increase both the profit of the Web page provider and the value of the Web page. An example will be described below regarding this point.

In the method of selectively distributing the advertising content with the high bid price as described above in the related art, for example, the profit of the Web page provider can be increased because a high advertising fee is obtained from the advertiser so that the advertisement listing fee paid to the Web page provider is increased. However, this method cannot always increase the value of the Web page because it is not always the case that the advertising content matching the Web page or the advertising content of a field in which a user is interested is placed on the Web page.

On the other hand, in the method of selectively distributing the advertising content matching the keyword included in the Web page or the advertising content matching the user attribute, for example, the value of the Web page can be increased because the advertising content matching the Web page or the user is placed so that there is a high possibility a Web page having a good impression on the user can be provided to the user. However, this method cannot always increase the profit of the Web page provider because the advertising content with a low bid price is possibly placed.

It has therefore been difficult to increase both the profit of the Web page provider and the value of the Web page in the technology of distributing the advertising content.

SUMMARY OF THE INVENTION

It is an object of the present invention to at least partially solve the problems in the conventional technology.

According to one aspect of an embodiment, an advertisement distribution device includes a distribution unit configured to distribute advertising content while switching an advertisement distribution process in accordance with a predetermined target figure within the range an advertisement listing fee paid to a provider of a Web page on which the advertising content is placed reaches the predetermined target figure.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating an example of an advertising content storage unit according to the embodiment;

FIG. 5 is a diagram illustrating an example of a provider information storage unit according to the embodiment;

DETAILED DESCRIPTION OF THE PREFERRED EMBODIMENTS

A mode of implementing an advertisement distribution device, an advertisement distribution method, and an advertisement distribution program according to the present application (hereinafter referred to as an "embodiment") will now be described in detail with reference to the drawings. Note that the advertisement distribution device, the advertisement distribution method, and the advertisement distribution program according to the present application are not to be limited by the embodiment. Moreover, an identical reference number is assigned to an identical part illustrated in each embodiment below, while overlapping description will be omitted.

1. Advertisement Distribution Process

Figure 1:
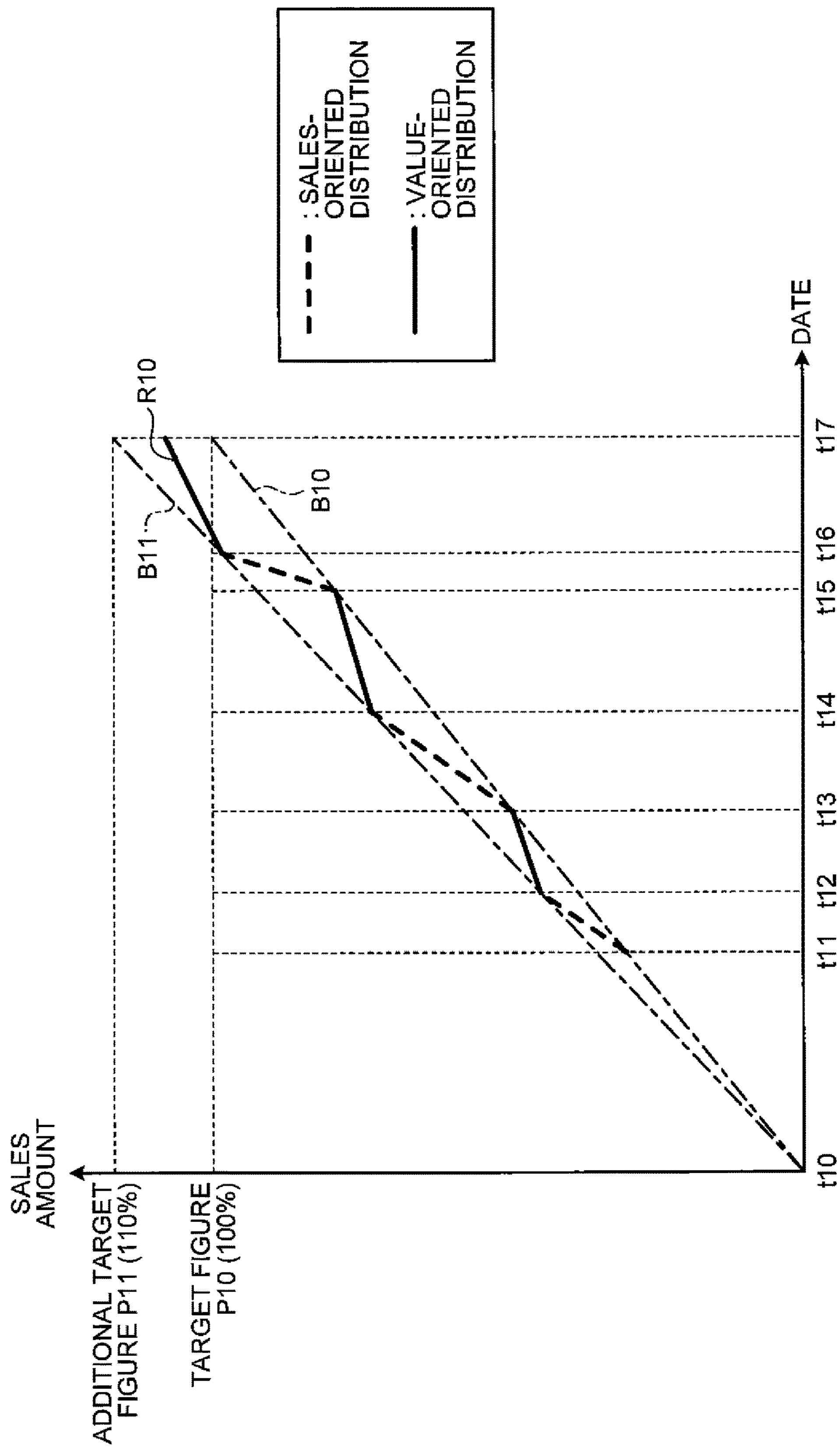
FIG. 1 is a diagram illustrating an example of an advertisement distribution process according to an embodiment.

An example of an advertisement distribution process according to an embodiment will be described first with reference to FIG. 1. FIG. 1 is a diagram illustrating an example of the advertisement distribution process according to the embodiment. FIG. 1 illustrates an example where the advertisement distribution process is performed by an advertisement distribution device 100 illustrated in FIG. 2 to be described later.

The advertisement distribution device 100 accepts, from an advertiser, the submission of advertising content to be placed (displayed) on a Web page as well as a bid price used to calculate a unit price of an advertising fee to be paid to an advertisement distributor (such as an administrator of the advertisement distribution device 100) by the advertiser when the advertising content is clicked once. The advertisement distributor then charges the advertiser for the advertising fee in accordance with the number of times the advertising content placed on the Web page is clicked. A part or all of the advertising fee obtained from the advertiser is paid to a Web page provider who provides the Web page. That is, the Web page provider earns an advertisement listing fee from the advertiser or the advertisement distributor by placing the advertising content on the Web page.

In order to earn the advertisement listing fee that is higher than or equal to a target figure, the Web page provider sometimes makes a request to the advertisement distributor by notifying the advertisement distribution device 100 of the target figure for the advertisement listing fee. Apart from this, the Web page provider generally desires to provide a Web page that has a good impression to a user because providing a Web page with a good impression leads to an increased access count for the Web page, for example. Now, the advertisement distribution device 100 according to the embodiment achieves the target figure for the advertisement listing fee paid to the Web page provider and increases the value of the Web page at the same time. This point will now be described with reference to an example illustrated in FIG. 1.

A vertical axis of a graph illustrated in FIG. 1 represents an amount of the advertisement listing fee paid to the Web page provider and thus corresponds to a sales amount for the Web page provider. A horizontal axis of the graph illustrated in FIG. 1 represents a date (time). FIG. 1 illustrates an example where the advertisement distribution device 100 accepts, from the Web page provider, a target figure P10 for the advertisement listing fee during a predetermined period. In this case, the predetermined period corresponds to a month or three months, for example, and corresponds to a period from a date t10 to a date t17 in the example illustrated in FIG. 1. Note that a period for which the target figure for the advertisement listing fee is set may be hereinafter labeled as a "target period."

In this case, the advertisement distribution device 100 calculates, on the basis of the target figure P10, a target figure for the advertisement listing fee corresponding to each elapsed time from the starting date t10 of the target period. FIG. 1 illustrates the case where the advertisement distribution device 100 calculates, as the target figure corresponding to each elapsed time, a target figure line B10 which increases at a constant pace during the target period and reaches the target figure P10 on the final date t17 of the target period. Specifically, the advertisement distribution device 100 calculates the target figure line B10 by using expression (1) as follows while letting "te" be a total time in the target period and "t" be the time elapsed from the starting date t10. Note that the time has a unit of "seconds", "minutes", and/or "hours", for example.

$$\text{Target figure line } B10 = \text{target figure } P10 \times (t/te) \qquad (1)$$

The advertisement distribution device 100 further calculates an additional target figure P11 that is a target figure obtained by adding a predetermined value to the target figure P10. Here, the advertisement distribution device 100 calculates a value greater than the target figure P10 by 10% (that is, "target figure P10"×"1.1") to be the additional target figure P11. The advertisement distribution device 100 then calculates a target figure line for the additional target figure P11 as with the target figure P10. The target figure line corresponding to the additional target figure P11 is referred to as an "additional target figure line" in this case. That is, the advertisement distribution device 100 calculates an additional target figure line B11 by expression (2) below.

$$\text{Additional target figure line } B11 = \text{additional target figure } P11 \times (t/te) \qquad (2)$$

where additional target figure P11=target figure P10×1.1

Each of the target figure line B10 calculated by expression (1) and the additional target figure line B11 calculated by expression (2) increases at a constant pace as time elapses and is thus represented by a straight line as illustrated in FIG. 1.

Moreover, the advertisement distribution device 100 switches the advertisement distribution process such that the advertisement listing fee paid to the Web page provider increases between the target figure line B10 and the additional target figure line B11. In the example illustrated in FIG. 1, a sales result R10 increasing between the target figure line B10 and the additional target figure line B11 represents the advertisement listing fee that is actually paid to the Web page provider.

At time t11 illustrated in FIG. 1, for example, the advertisement listing fee paid to the Web page provider is higher than the target figure line B10 but lower than the additional target figure line B11. In this case, the advertisement distribution device 100 performs an advertisement distribution process using a bid price. The advertisement distribution device 100 preferentially distributes advertising content with a high bid price, for example. As a result, the advertisement listing fee paid to the Web page provider can be kept at a high standard because a high advertising fee can be obtained from the advertiser. Note that the advertisement distribution process using the bid price may be hereinafter referred to as "sales-oriented distribution."

Then, the advertisement distribution device 100 performs an advertisement distribution process not using the bid price when the advertisement listing fee paid to the Web page provider has reached the additional target figure line B11 at time t12 illustrated in FIG. 1 by performing the sales-oriented distribution. The advertisement distribution device 100 preferentially distributes advertising content that matches a keyword included in the Web page or a user attribute without considering the bid price, for example. As a result, the advertisement distribution device 100 can increase the value of the Web page because the device can distribute the advertising content that matches the Web page or the advertising content that matches the user attribute of a user browsing the Web page. When the advertisement distribution process is performed without considering the bid price, however, a rate of increase of the advertisement listing fee paid to the Web page provider is often decreased due to the possibility that advertising content with a low bid price is distributed. Note that the advertisement distribution process emphasizing the value of the Web page without using the bid price may be hereinafter referred to as "value-oriented distribution."

The sales result R10 in a dotted line in FIG. 1 indicates that the sales-oriented distribution is performed by the advertisement distribution device 100, whereas the sales result R10 in a solid line in FIG. 1 indicates that the value-oriented distribution is performed by the advertisement distribution device 100. That is, FIG. 1 illustrates the case where the advertisement distribution device 100 performs the sales-oriented distribution on the dates t11 to t12, t13 to t14, and t15 to t16 and performs the value-oriented distribution on the dates t12 to t13, t14 to t15, and t16 to t17. While the sales result R10 is not illustrated in the period corresponding to the dates t10 to t11 in FIG. 1, the advertisement distribution device 100 performs the aforementioned process as well in the period corresponding to the dates t10 to t11. Moreover, the advertisement distribution device 100 performs the sales-oriented advertisement distribution process on the starting date t10 of the target period, for example, although either the sales-oriented or value-oriented advertisement distribution process may be performed.

The advertisement distribution device 100 according to the embodiment performs the sales-oriented distribution using the bid price as described above in order to at least reach the target figure for the advertisement listing fee. The advertisement distribution device 100 then performs the value-oriented distribution not using the bid price when the sales has gained the pace to sufficiently reach the target figure for the advertisement listing fee by performing the sales-oriented distribution. Accordingly, the advertisement distribution device 100 can increase both the advertising profit of the Web page provider and the value of the Web page. The advertisement distribution device 100 performing such advertisement distribution process will be described in detail below.

2. Configuration of Advertisement Distribution System

Figure 2:
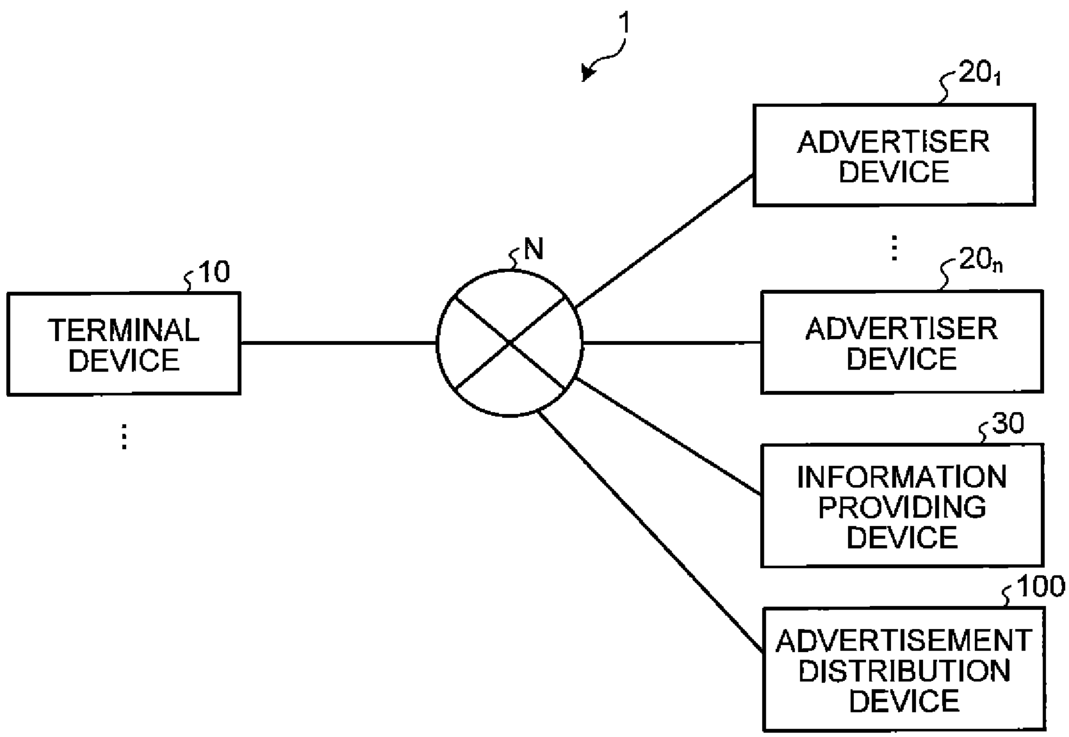
FIG. 2 is a diagram illustrating an example of a configuration of an advertisement distribution system according to the embodiment.

Now, a configuration of an advertisement distribution system according to the embodiment will be described with reference to FIG. 2. FIG. 2 is a diagram illustrating an example of the configuration of an advertisement distribution system 1 according to the embodiment. As illustrated in FIG. 2, the advertisement distribution system 1 includes a terminal device 10, advertiser devices $\mathbf{20}_1$ to $\mathbf{20}_n$, an information providing device 30, and the advertisement distribution device 100. The terminal device 10, the advertiser devices $\mathbf{20}_1$ to $\mathbf{20}_n$, the information providing device 30, and the advertisement distribution device 100 are in wired or wireless connection to be able to communicate with one another through a network N. Note that the advertisement distribution system 1 illustrated in FIG. 2 may include a plurality of the terminal device 10, a plurality of the information providing device 30, or a plurality of the advertisement distribution device 100.

The terminal device 10 is an information processing device such as a desktop PC (Personal Computer), a notebook PC, a tablet terminal, a mobile phone or a PDA (Personal Digital Assistant). The terminal device 10 acquires a Web page from the information providing device 30 by accessing the information providing device 30 and displays the acquired Web page on a display (such as a liquid crystal display), for example. The terminal device 10 also acquires advertising content from the advertisement distribution device 100 by accessing the advertisement distribution device 100 when an advertising space is included in a Web page, and displays the acquired advertising content on the Web page. In addition to the aforementioned example, the terminal device 10 may also acquire a Web page including the advertising content from the information providing device 30, in which case the information providing device 30 distributes to the terminal device 10 a Web page incorporating the advertising content distributed by the advertisement distribution device 100.

Each of the advertiser devices $\mathbf{20}_1$ to $\mathbf{20}_n$ is an information processing device used by the advertiser who makes a request to distribute an advertisement to the advertisement distribution device 100. Each of the advertiser devices $\mathbf{20}_1$ to $\mathbf{20}_n$ submits advertising content to the advertisement distribution device 100 in accordance with an operation by the advertiser. The advertising content submitted to the advertisement distribution device 100 by the advertiser devices $\mathbf{20}_1$ to $\mathbf{20}_n$ according to the embodiment corresponds to a still image, a moving image, text data, a URL (Uniform Resource Locator) used to access a Web page provided by an advertiser server that is managed by the advertiser, and the like.

The advertiser also sometimes requests an agency to submit the advertising content without using the advertiser devices $\mathbf{20}_1$ to $\mathbf{20}_n$ to submit the advertising content to the advertisement distribution device 100. In this case, the agency submits the advertising content to the advertisement distribution device 100. The expression "advertiser" hereinafter includes not only the advertiser but the agency, whereby the expression "advertiser device" includes not only the advertiser device but an agency device used by the agency. Moreover, the advertiser devices $\mathbf{20}_1$ to $\mathbf{20}_n$ may be hereinafter collectively referred to as an "advertiser device 20" when there is no need to distinguish the advertiser devices $\mathbf{20}_1$ to $\mathbf{20}_n$ because each of these devices has a similar function.

The information providing device 30 is a Web server or the like which is managed by the Web page provider to provide a Web page to the terminal device 10. The information providing device 30 provides various Web pages related to a news site, an auction site, a weather forecast site, a shopping site, a finance (stock price) site, a route search site, a map providing site, a travel site, a restaurant profile site, and a Web blog, for example. The Web page provider earns the advertisement listing fee by displaying advertising content on these Web pages.

The advertisement distribution device 100 is a server device that distributes the advertising content submitted from the advertiser device 20. As described above, the advertisement distribution device 100 distributes the advertising content to the terminal device 10 when accessed thereby. The advertisement distribution device 100 distributes the advertising content to the information providing device 30 when accessed thereby. The advertisement distributor who manages such advertisement distribution device 100 earns the advertising fee from the advertiser when the user clicks the advertising content distributed to the terminal device 10. A part or all of the advertising fee paid by the advertiser is then paid as the advertisement listing fee from the advertiser or the advertisement distributor to the Web page provider who provides the Web page on which the clicked advertising content is placed.

3. Configuration of Advertisement Distribution Device

Figure 3:
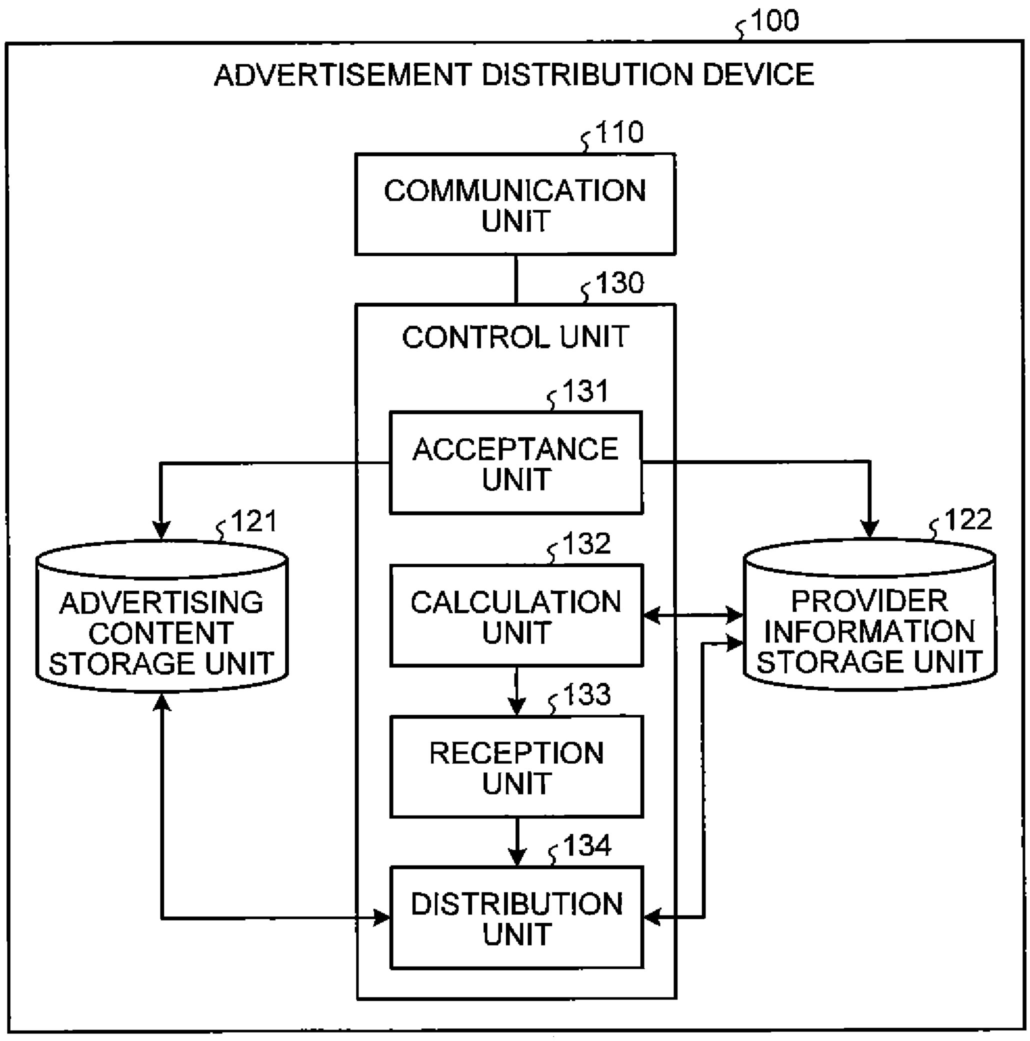
FIG. 3 is a diagram illustrating an example of a configuration of an advertisement distribution device according to the embodiment.

A configuration of the advertisement distribution device 100 according to the embodiment will now be described with reference to FIG. 3. FIG. 3 is a diagram illustrating an example of the configuration of the advertisement distribution device 100 according to the embodiment. As illustrated in FIG. 3, the advertisement distribution device 100 includes a communication unit 110, an advertising content storage unit 121, a provider information storage unit 122, and a control unit 130. Note that the advertisement distribution device 100 may include an input unit (such as a keyboard or a mouse) which accepts various operations from the administrator or the like who uses the advertisement distribution device 100, and a display unit (such as a liquid crystal display) which displays various information.

Communication Unit 110

The communication unit 110 is implemented by an NIC (Network Interface Card), for example. The communication unit 110 is in wired or wireless connection with the network N and transmits/receives information to/from the terminal device 10, the advertiser device 20, and the information providing device 30 through the network N.

Storage Unit

Each of the advertising content storage unit 121 and the provider information storage unit 122 is implemented by a semiconductor memory element such as a RAM (Random Access Memory) or a flash memory, or by a storage such as a hard disk or an optical disk.

Advertising Content Storage Unit 121

The advertising content storage unit 121 stores the advertising content submitted from the advertiser device 20. An example of the advertising content storage unit 121 according to the embodiment is illustrated in FIG. 4. FIG. 4 illustrates the example where the advertising content storage unit 121 has an item including an "advertiser ID," "advertising content," a "bid price," and a "keyword."

The "advertiser ID" represents identification information which identifies the advertiser or the advertiser device 20. The "advertising content" represents the advertising content submitted from the advertiser device 20. While FIG. 4 illustrates the example where conceptual information such as "C11" and "C12" is stored under the item "advertising content," the storage unit in reality stores a still image, a moving image, text data, a URL, or a file path name indicating a stored location of these pieces of information.

The "bid price" represents the advertising fee specified by the advertiser at the time of submitting the advertising content. In the present embodiment, the "bid price" corresponds to a unit price (in "yen," for example) of the amount charged to the advertiser by the advertisement distributor (such as the administrator of the advertisement distribution device 100) when the advertising content is clicked once by the user. Note that the bid price is not always identical to the unit price of the charge amount, where the unit price of the charge amount is sometimes calculated from the bid price. The "keyword" is a character string or the like extracted from the advertising content and corresponds to a character string representing a field or a characteristic of the advertising content. While FIG. 4 illustrates the example where the advertising content storage unit 121 stores conceptual information such as "K11" and "K12" under the item "keyword," the storage unit in reality stores information such as an "automobile" and "travel." Moreover, the advertising content storage unit 121 sometimes stores a plurality of keywords for a single piece of advertising content.

Accordingly, FIG. 4 illustrates the example where the advertiser identified by an advertiser ID "A10" specifies the bid price of "100 yen" and submits the advertising content "C11." Also illustrated in FIG. 4 is the example where the keyword "K11" is extracted from the advertising content "C11."

Although not illustrated in FIG. 4, the advertising content storage unit 121 may also store a "CTR" (Click Through Rate) or the like. The "CTR" represents an effect of advertising when the advertising content is distributed to the terminal device 10 and corresponds to a value calculated by dividing the number of times the advertising content is clicked by the user by the number of times the advertising content is displayed, for example.

Provider Information Storage Unit 122

The provider information storage unit 122 stores various information related to the Web page provider who provides the Web page. An example of the provider information storage unit 122 according to the embodiment is illustrated in FIG. 5. FIG. 5 illustrates the example where the provider information storage unit 122 has an item including a "provider ID," a "target sales amount," a "current sales amount," and a "distribution mode."

The "provider ID" represents identification information which identifies the Web page provider or the information providing device 30. The "target sales amount" is a piece of information specified by the Web page provider and represents the target figure for the advertisement listing fee to be earned by the Web page provider. FIG. 5 illustrates the example where the Web page provider specifies the target figure for each month so that the target figure for one month is stored under the "target sales amount." The "current sales amount" represents a total amount of advertisement listing fee paid to the Web page provider at a current time point. FIG. 5 illustrates the example where the "current sales amount" is cleared to "0" after each month and accordingly stores an accumulated amount of advertisement listing fee paid in one month. The "distribution mode" represents which of the sales-oriented distribution and the value-oriented distribution is employed to perform the advertisement distribution process. FIG. 5 illustrates the example where the advertisement distribution device 100 performs the sales-oriented distribution when "sales-oriented" is stored under the distribution mode and performs the value-oriented distribution when "value-oriented" is stored under the distribution mode.

That is, FIG. 5 illustrates the example where the Web page provider identified by a provider ID "W10" specifies "P10" as the target sales amount per month while the advertisement listing fee paid to the Web page provider at the current time point is "p11." Also illustrated in FIG. 5 is the example where the sales-oriented distribution is performed when distributing the advertising content to the Web page provided by the Web page provider identified by the provider ID "W10."

While FIG. 5 illustrates the example where the provider information storage unit 122 stores the target sales amount for each month, the provider information storage unit 122 may also store the target sales amount for each period other than each month (such as each week or each three months), for example. Moreover, the provider information storage unit 122 may store the target sales amount corresponding to a period with specified dates (such as Mar. 1, 2013 to Mar. 31, 2013), for example.

Control Unit 130

The control unit 130 is implemented when various programs (corresponding to an example of an advertisement distribution program) stored in a storage within the advertisement distribution device 100 is executed by a CPU (Central Processing Unit) or an MPU (Micro Processing Unit) while using a RAM as a work area. The control unit 130 is also implemented by an integrated circuit such as an ASIC (Application Specific Integrated Circuit) or an FPGA (Field Programmable Gate Array).

As illustrated in FIG. 3, the control unit 130 includes an acceptance unit 131, a calculation unit 132, a reception unit 133, and a distribution unit 134 and realizes or executes a function or operation of information processing to be described below. Note that the control unit 130 may have not only the internal configuration illustrated in FIG. 3 but another configuration as long as it is configured to execute the information processing to be described below. Moreover, each of the processing units included in the control unit 130 may be not only in the connection relation illustrated in FIG. 3 but in another connection relation.

Acceptance Unit 131

The acceptance unit 131 accepts submission of the advertising content from the advertiser device 20. Specifically, the acceptance unit 131 accepts submission of the advertising content along with the bid price being specified. The acceptance unit 131 then extracts a keyword indicating the characteristic of the advertising content from the advertising content being submitted. Thereafter, the acceptance unit 131 stores, in the advertising content storage unit 121, the bid price and the keyword in association with the advertising content being submitted.

There are several processes by which the acceptance unit 131 extracts the keyword from the advertising content. When the advertising content is an HTML (HyperText Markup Language) file, for example, the acceptance unit 131 analyzes a morpheme in the text written in the HTML file and extracts, as the keyword, a morpheme that appears frequently, a character string specified as the title of the HTML file, or meta data of the HTML file (such as a character string written in a meta tag). The acceptance unit 131 also extracts meta data of image data as the keyword when the advertising content is the image data, for example. Furthermore, the acceptance unit 131 may accept submission of the keyword along with the advertising content from the advertiser (the advertiser device 20) without extracting the keyword from the advertising content. In this case, the acceptance unit 131 stores the keyword submitted from the advertiser into the advertising content storage unit 121.

The acceptance unit 131 further accepts the target figure for the advertisement listing fee from the information providing device 30 and stores the accepted target figure in the provider information storage unit 122 under the target sales amount. The acceptance unit 131 accepts the target figure for each predetermined period or the target figure for a specified period, for example. The acceptance unit 131 according to the embodiment accepts the target figure for each month.

Note that the acceptance unit 131 need not accept the target figure for the advertisement listing fee from the information providing device 30. That is, the Web page provider may contact the advertisement distributor and tell the target figure by an e-mail or phone, for example. The acceptance unit 131 in this case may accept the target figure for advertisement listing fee through the input unit or the like from the advertisement distributor.

Calculation Unit 132

The calculation unit 132 calculates a target figure corresponding to each time point within a target period on the basis of the target figure for the advertisement listing fee in the target period. Specifically, the calculation unit 132 according to the embodiment calculates, as the target figure corresponding to each time point, the target figure which increases at a constant pace with time and reaches the full target figure on the last date of the target period. As described with reference to FIG. 1, for example, the calculation unit 132 uses expression (1) above to calculate the target figure line that represents the target figure corresponding to each elapsed time within the target period.

The calculation unit 132 according to the embodiment further calculates the additional target figure corresponding to each time point within the target period on the basis of the additional target figure set by increasing the target figure by the predetermined value. Specifically, the calculation unit 132 calculates, as the additional target figure corresponding to each time point, the additional target figure which increases at a constant pace with time and reaches the full additional target figure on the last date of the target period. As described with reference to FIG. 1, for example, the calculation unit 132 uses expression (2) above to calculate the additional target figure line representing the additional target figure corresponding to each elapsed time within the target period.

The calculation unit 132 calculates the aforementioned target figure line and additional target figure line for each provider ID (or each Web page provider) stored in the provider information storage unit 122. Although not illustrated in FIG. 5, the calculation unit 132 may also store, in the provider information storage unit 122, the expression representing each of the target figure line and the additional target figure line in association with each provider ID.

Reception Unit 133

The reception unit 133 receives, from the terminal device 10 and the information providing device 30, a request to acquire the advertising content. The reception unit 133 receives the request to acquire the advertising content in the form of an HTTP (Hypertext Transfer Protocol) request, for example.

Note that the device transmitting the request to acquire the advertising content to the reception unit 133 varies depending on the Web page distributed by the information providing device 30. The reception unit 133 receives the request to acquire the advertising content from the terminal device 10 when a Web page with a URL to access the advertisement distribution device 100 is distributed to the terminal device 10, for example. On the other hand, the reception unit 133 receives the request to acquire the advertising content from the information providing device 30 when a Web page on which the advertising content is already incorporated is distributed to the terminal device 10. The reception unit 133 according to the present embodiment receives the request to acquire the advertising content from the terminal device 10.

Distribution Unit 134

The distribution unit 134 distributes any of the advertising content stored in the advertising content storage unit 121 when the reception unit 133 has received the request to acquire the advertising content. Specifically, the distribution unit 134 performs an updating process which updates the distribution mode in the provider information storage unit 122 and the advertisement distribution process which distributes the advertising content. The distribution unit 134 therefore distributes the advertising content while switching between the advertisement distribution process using the bid price and the advertisement distribution process not using the bid price within the range the advertisement listing fee paid to the Web page provider reaches the target figure, the Web page provider providing the Web page on which the advertising content is placed. Details of the distribution mode updating process and the advertisement distribution process performed by the distribution unit 134 will now be described separately.

The distribution mode updating process performed by the distribution unit 134 will be described first. The distribution unit 134 periodically monitors the current sales amount stored in the provider information storage unit 122. The distribution unit 134 then switches between the sales-oriented distribution and the value-oriented distribution by comparing the current sales amount with the target figure line and the additional target figure line that are calculated by the calculation unit 132.

Specifically, the distribution unit 134 targets each provider ID stored in the provider information storage unit 122 as a processing target and acquires the current sales amount corresponding to the target provider ID. The distribution unit 134 then compares the current sales amount acquired from the provider information storage unit 122 with the target figure line and the additional target figure line corresponding to the target provider ID (the Web page provider) from among the target figure line and the additional target figure line calculated by the calculation unit 132. More specifically, the distribution unit 134 calculates the target figure corresponding to the current time point by inputting the current elapsed time to "t" in expression (1) above and then compares the calculated target figure with the current sales amount. Likewise, the distribution unit 134 calculates the additional target figure corresponding to the current time point by inputting the current elapsed time to "t" in expression (2) above and then compares the calculated additional target figure with the current sales amount.

Accordingly, the distribution unit 134 updates the distribution mode to "sales-oriented" when the current sales amount is lower than the target figure and "value-oriented" is stored under the distribution mode in the provider information storage unit 122. On the other hand, the distribution unit 134 updates the distribution mode to "value-oriented" when the current sales amount is higher than the additional target figure and "sales-oriented" is stored under the distribution mode in the provider information storage unit 122. The distribution unit 134 does not update the distribution mode when the current sales amount is higher than or equal to the target figure and lower than or equal to the additional target figure.

The distribution unit 134 performs the aforementioned updating process for each provider ID stored in the provider information storage unit 122 as described above. As a result, the distribution unit 134 switches the advertisement distribution process to either the sales-oriented distribution or the value-oriented distribution such that the advertisement listing fee increases between the target figure line and the additional target figure line calculated by the calculation unit 132.

Note that the distribution unit 134 in the aforementioned example can update the distribution mode in the provider information storage unit 122 at any timing. For example, the distribution unit 134 may update the distribution mode by monitoring the current sales amount periodically (such as every minute, every hour, or every day) or may perform the aforementioned updating process on the target provider (the provider ID) of the Web page, on which the advertising content to be distributed is placed, every time the reception unit 133 receives the request to acquire the advertising content.

Next, the advertisement distribution process performed by the distribution unit 134 will be described. The distribution unit 134 specifies the Web page provider who is the provider of the Web page on which the advertising content is placed, when the reception unit 133 has received the request to acquire the advertising content. When receiving the request to acquire the advertising content from the terminal device 10, for example, the reception unit 133 also receives from the terminal device 10 a URL or the like of the Web page on which the advertising content is placed. In this case, the distribution unit 134 specifies the Web page provider on the basis of the URL transmitted from the terminal device 10. Moreover, the distribution unit 134 specifies the Web page provider on the basis of a transmitter of the request to acquire the advertising content, when the reception unit 133 has received the request from the information providing device 30. The distribution unit 134 then acquires from the provider information storage unit 122 the distribution mode corresponding to the provider ID of the Web page provider specified as described above and performs the advertisement distribution process according to the acquired distribution mode.

An example of the sales-oriented distribution and the value-oriented distribution performed by the distribution unit 134 will now be described. When performing the sales-oriented distribution, for example, the distribution unit 134 preferentially distributes the advertising content with a high bid price among the advertising content stored in the advertising content storage unit 121. Moreover, the distribution unit 134 preferentially distributes the advertising content having both the high bid price and a high CTR, for example. The distribution unit 134 preferentially distributes the advertising content having a high multiplication or addition result between the bid price and the CTR, for example. Note that the distribution unit 134 may use a predicted CTR that is predicted from a prediction model or the like for the CTR without using the actual CTR itself stored in the advertising content storage unit 121. The predicted CTR is predicted by a type of the advertising content or a type of the Web page on which the advertising content is displayed, for example.

When performing the value-oriented distribution, the distribution unit 134 preferentially distributes the advertising content having a high degree of correspondence between a keyword included in the Web page on which the advertising content is placed and the keyword stored in the advertising content storage unit 121, for example. Moreover, when performing the value-oriented distribution, the distribution unit 134 preferentially distributes the advertising content having a high degree of correspondence between a user attribute of the user who browses the Web page and the keyword stored in the advertising content storage unit 121, for example. Furthermore, when performing the value-oriented distribution, the distribution unit 134 preferentially distributes the advertising content having a high degree of correspondence with a search keyword that is input to a search site by the user. Note that the advertisement distribution device 100 holds a user information storage unit which stores the user attribute corresponding to each user. The user attribute stored in the user information storage unit is collected on the basis of the Web page browsed by the user or information of a product purchased by the user through the Web page.

The distribution unit 134 receives a click notification from the terminal device 10 when the distributed advertising content is clicked by the user. In this case, the distribution unit 134 updates the "current sales amount" stored in the provider information storage unit 122 on the basis of the click notification, the "current sales amount" corresponding to the provider (the Web page provider) of the Web page on which the clicked advertising content is placed. In a case where 50% of the advertising fee paid by the advertiser is paid to the Web page provider, for example, the distribution unit 134 adds 50% of the bid price of the clicked advertising content to the "current sales amount." Moreover, the distribution unit 134 updates the "current sales amount" stored in the provider information storage unit 122 to "0" when the target period is renewed. The distribution unit 134 updates the "current sales amount" to "0" after each month when the target figure for the advertisement listing fee is set for each month, for example.

4. Procedure of Distribution Mode Updating Process

Figure 6:
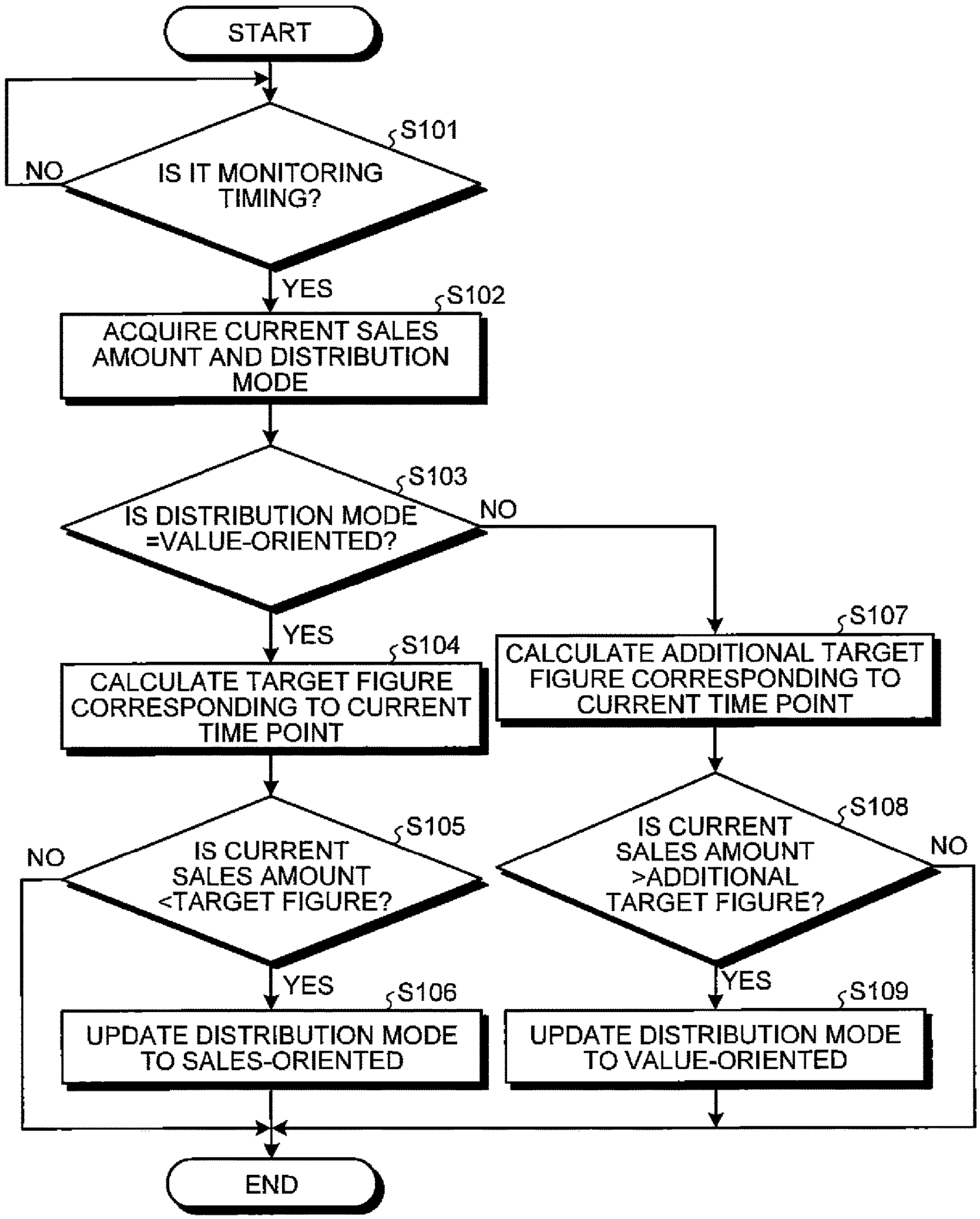
FIG. 6 is a flowchart illustrating a procedure of a distribution mode updating process performed by the advertisement distribution device according to the embodiment.

Now, a procedure of a distribution mode updating process performed by the advertisement distribution device 100 according to the embodiment will be described with reference to FIG. 6. FIG. 6 is a flowchart illustrating the procedure of the distribution mode updating process performed by the advertisement distribution device 100 according to the embodiment. Note that in the example illustrated in FIG. 6, the target figure line and the additional target figure line are calculated in advance by the calculation unit 132.

As illustrated in FIG. 6, the distribution unit 134 of the advertisement distribution device 100 determines whether or not a timing to monitor the current sales amount has come (step S101). The distribution unit 134 stands by until the monitoring timing comes when the monitoring timing has not come yet (step S101; No).

When the monitoring timing has come (step S101; Yes), on the other hand, the distribution unit 134 acquires the current sales amount and the distribution mode corresponding to the target provider ID from the provider information storage unit 122 (step S102).

Subsequently, the distribution unit 134 calculates the target figure corresponding to the current time point (step S104) on the basis of the target figure line corresponding to the target provider ID (the Web page provider) when the distribution mode acquired from the provider information storage unit 122 is "value-oriented" (step S103; Yes). The distribution unit 134 then updates the distribution mode stored in the provider information storage unit 122 from "value-oriented" to "sales-oriented" (step S106) when the current sales amount acquired from the provider information storage unit 122 is lower than the target figure corresponding to the current time point (step S105; Yes).

When the distribution mode acquired from the provider information storage unit 122 is not "value-oriented" but "sales-oriented" (step S103; No), on the other hand, the distribution unit 134 calculates the additional target figure corresponding to the current time point on the basis of the additional target figure line corresponding to the target provider ID (the Web page provider) (step S107). The distribution unit 134 then updates the distribution mode stored in the provider information storage unit 122 from "sales-oriented" to "value-oriented" (step S109) when the current sales amount acquired from the provider information storage unit 122 is higher than the additional target figure corresponding to the current time point (step S108; Yes). Accordingly, the distribution unit 134 performs the distribution mode updating process as described above for all provider IDs stored in the provider information storage unit 122.

5. Procedure of Advertisement Distribution Process

Figure 7:
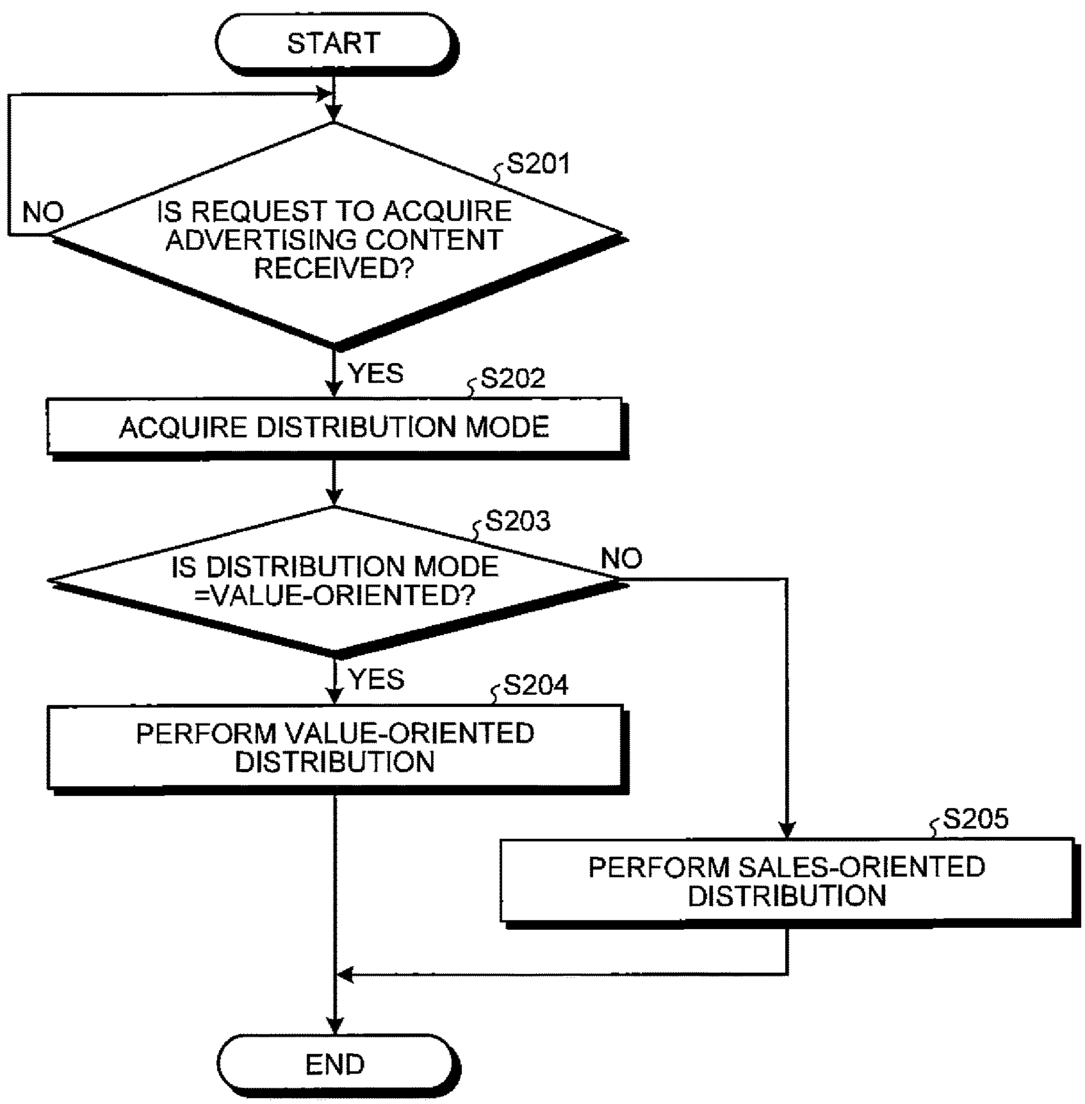
FIG. 7 is a flowchart illustrating a procedure of the advertisement distribution process performed by the advertisement distribution device according to the embodiment.

Now, a procedure of the advertisement distribution process performed by the advertisement distribution device 100 according to the embodiment will be described with reference to FIG. 7. FIG. 7 is a flowchart illustrating the procedure of the advertisement distribution process performed by the advertisement distribution device 100 according to the embodiment.

As illustrated in FIG. 7, it is determined whether or not the reception unit 133 of the advertisement distribution device 100 has received the request to acquire the advertising content (step S201). The reception unit 133 stands by until the acquisition request is received when the acquisition request has not been received yet (step S201; No).

When the acquisition request has been received by the reception unit 133 (step S201; Yes), on the other hand, the distribution unit 134 specifies the Web page provider who is the provider of the Web page on which the advertising content is placed, and acquires the distribution mode corresponding to the provider ID of the specified Web page provider from the provider information storage unit 122 (step S202).

Subsequently, the distribution unit 134 performs the value-oriented distribution not using the bid price (step S204) when the distribution mode acquired from the provider information storage unit 122 is "value-oriented" (step S203; Yes). On the other hand, the distribution unit 134 performs the sales-oriented distribution using the bid price (step S205) when the distribution mode is not "value-oriented" but "sales-oriented" (step S203; No). Note that the distribution unit 134 performs the sales-oriented distribution using the bid price at the start of the target period, for example.

6. Variation

The advertisement distribution device 100 according to the aforementioned embodiment may be implemented in various different modes other than the embodiment described above. Now, another embodiment of the aforementioned advertisement distribution device 100 will be described.

6-1. Target Figure Line

Figure 8:
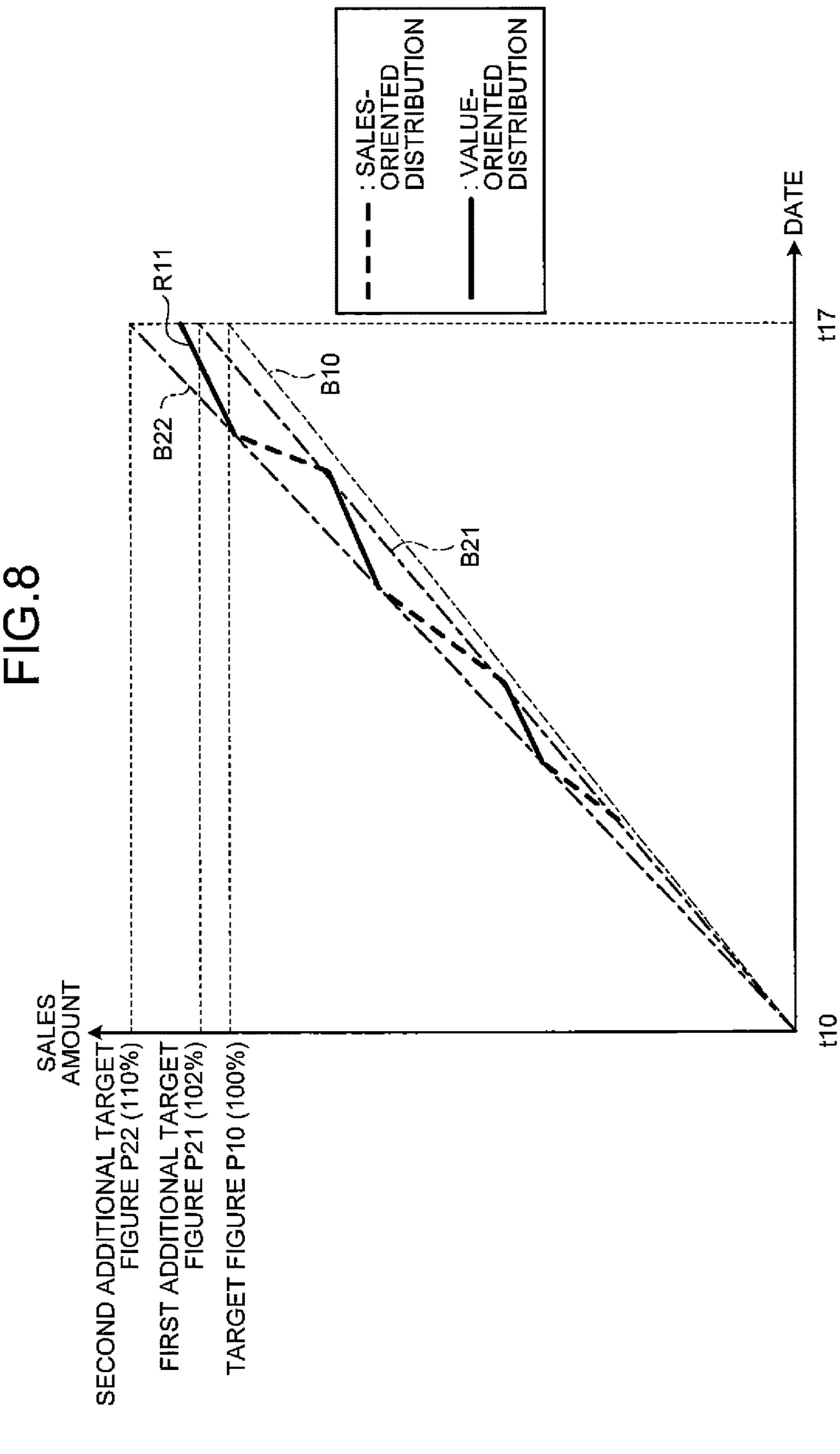
FIG. 8 is a diagram illustrating an example of an advertisement distribution process according to a variation.

The aforementioned embodiment illustrates the example where the calculation unit 132 calculates the target figure line that reaches the target figure on the final date of the target period. In the example illustrated in FIG. 1, for example, the calculation unit 132 calculates the target figure line B10 that increases at a constant pace during the target period (the dates t10 to t17) and reaches the target figure P10 on the final date t17 of the target period. However, the calculation unit 132 may also calculate the target figure line by using a target figure that is increased by a predetermined value. This point will be described with reference to FIG. 8. FIG. 8 is a diagram illustrating an example of an advertisement distribution process according to a variation.

Similar to the example illustrated in FIG. 1, FIG. 8 illustrates an example where an advertisement distribution device 100 accepts a target FIG. 210 from a Web page provider. Here, a calculation unit 132 of the advertisement distribution device 100 calculates a first additional target figure line B21 on the basis of a first additional target figure P21 calculated by adding a first value ("2% of the target figure P10" in this case) to the target figure P10. The calculation unit 132 also calculates a second additional target figure line B22 on the basis of a second additional target figure P22 calculated by adding a second value greater than the first value ("10% of the target figure P10" in this case) to the target figure P10. Note that the second additional target figure P22 has the same value as the additional target figure P11 illustrated in FIG. 1, whereby the second additional target figure line B22 is identical to the additional target figure line B11 illustrated in FIG. 1.

A distribution unit 134 then switches a distribution mode such that a sales result R11 increases between the first additional target figure line B21 and the second additional target figure line B22 as illustrated in the example in FIG. 8. Specifically, the distribution unit 134 updates the distribution mode stored in a provider information storage unit 122 to "sales-oriented" when a current advertisement listing fee is lower than the first additional target figure corresponding to the current time point. On the other hand, the distribution unit 134 updates the distribution mode stored in the provider information storage unit 122 to "value-oriented" when the current advertisement listing fee is higher than the second additional target figure corresponding to the current time point. Note that the advertisement distribution device 100 performs the process of switching the distribution mode during the period from dates t10 to t17 although there is a section within the dates t10 to t17 where the sales result R11 is not illustrated in FIG. 8.

As a result, there is an increased possibility that the advertisement listing fee reaches the target figure P10 during the target period because the advertisement distribution device 100 performs the advertisement distribution process to reach the first additional target figure P21. In a case where the advertisement distribution device 100 monitors the current sales amount at a long interval, for example, it is possible that the current sales amount falls below the first additional target figure line B21 between monitoring intervals. The advertisement distribution device 100 can however decrease the possibility that the current sales amount falls below the target figure line B10 by using the first additional target figure line B21. As a result, the advertisement distribution device 100 can reduce the load of monitoring by increasing the interval at which the current sales amount is monitored and at the same time increase both the advertising profit of the Web page provider and the value of the Web page.

6-2. Additional Target Figure Line

Figure 9:
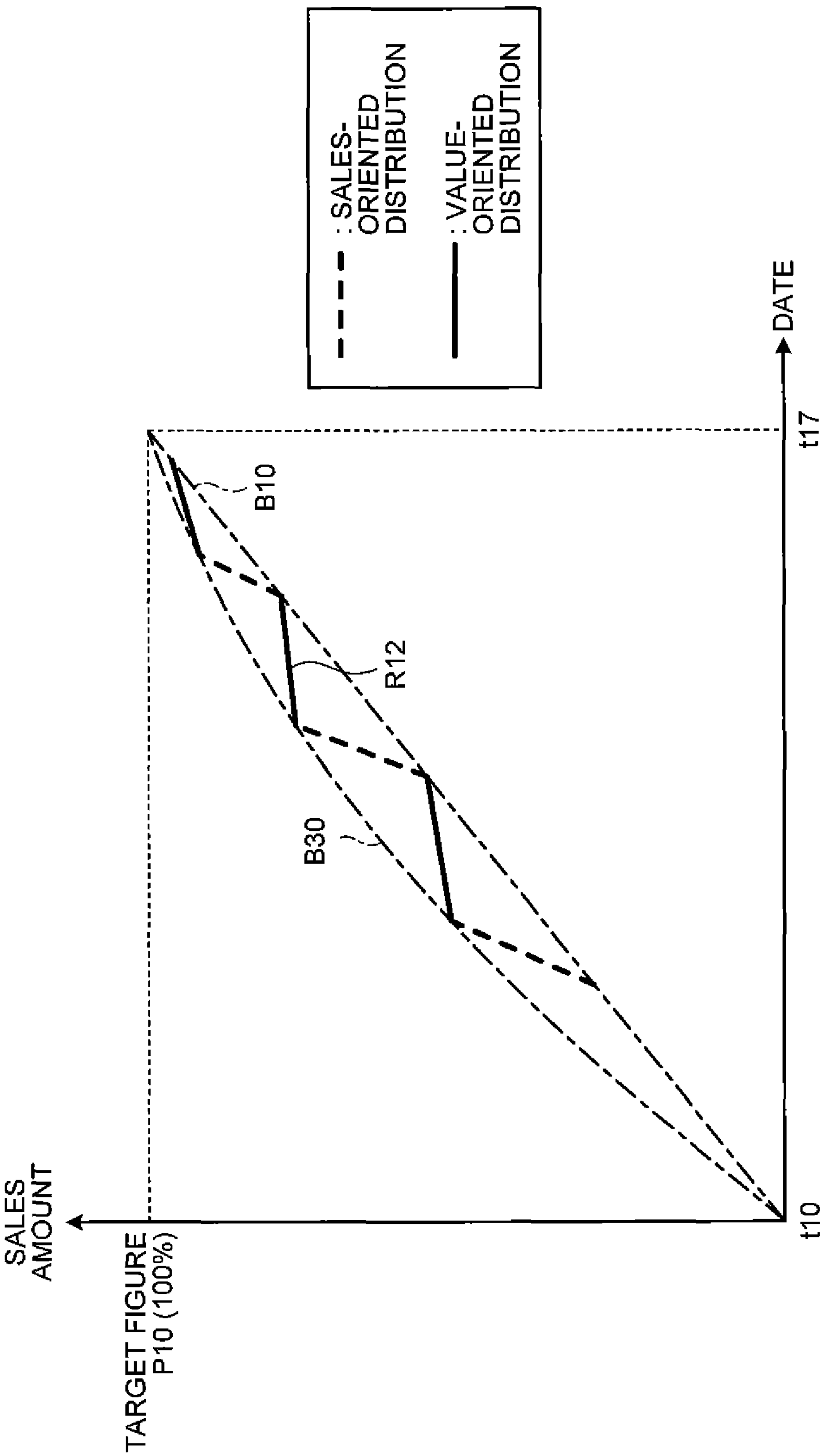
FIG. 9 is a diagram illustrating an example of the advertisement distribution process according to the variation.

The aforementioned embodiment also illustrates the example where the calculation unit 132 calculates the linear additional target figure line that increases at a constant pace and reaches the full additional target figure on the final date of the target period. However, the calculation unit 132 may also calculate a curved additional target figure line that reaches not the additional target figure but the full target figure on the final date of the target period. This point will be described with reference to FIG. 9. FIG. 9 is a diagram illustrating an example of the advertisement distribution process according to the variation.

Similar to the example illustrated in FIG. 1, FIG. 9 illustrates an example where the advertisement distribution device 100 accepts the target figure P10 from the Web page provider. Here, the calculation unit 132 of the advertisement distribution device 100 calculates the target figure line B10 as is the case with the example illustrated in FIG. 1. In the example illustrated in FIG. 9, the calculation unit 132 also calculates a curved additional target figure line B30 that reaches the target figure P10 on the final date t17 of the target period without calculating the additional target figure. Specifically, the calculation unit 132 calculates the additional target figure line B30 that is greater than the target figure line B10 at each time point within the target period and approaches the target figure line B10 as the line B30 approaches the final date t17 of the target period. Letting "te" be a total time in the target period and "t" be the time elapsed from a starting date t10, the calculation unit 132 calculates the additional target figure line B30 by using expression (3) as follows, for example.

$$\text{Additional target figure line } B30 = \text{target figure } P10 \times \{(t^2-2t)/(te^2-2te)\} \quad (3)$$

The distribution unit 134 then switches the distribution mode such that a sales result R12 increases between the target figure line B10 and the additional target figure line B30 as illustrated in the example in FIG. 9. Specifically, the distribution unit 134 updates the distribution mode stored in the provider information storage unit 122 to "sales-oriented" when the current advertisement listing fee is lower than the target figure corresponding to the current time point acquired from the target figure line B10. On the other hand, the distribution unit 134 updates the distribution mode stored in the provider information storage unit 122 to "value-oriented" when the current advertisement listing fee is higher than the additional target figure corresponding to the current time point acquired from the additional target figure line B30. Note that the advertisement distribution device 100 performs the process of switching the distribution mode during the period from the dates t10 to t17 although there is a section within the dates t10 to t17 where the sales result R12 is not illustrated in FIG. 9.

Accordingly, the advertisement distribution device 100 can increase both the advertising profit of the Web page provider and the value of the Web page by using the additional target figure line B30 and at the same time prevent the advertisement listing fee from becoming excessively higher than the target figure.

While FIG. 9 illustrates the example where the additional target figure line B30 reaches the target figure P10 on the final date t17 of the target period, the additional target figure line B30 may reach a target figure that is higher than the target figure P10 by a predetermined value (such as "2% of the target figure P10") on the final date t17, for example.

6-3. Control Based Solely on Target Figure Line

Figure 10:
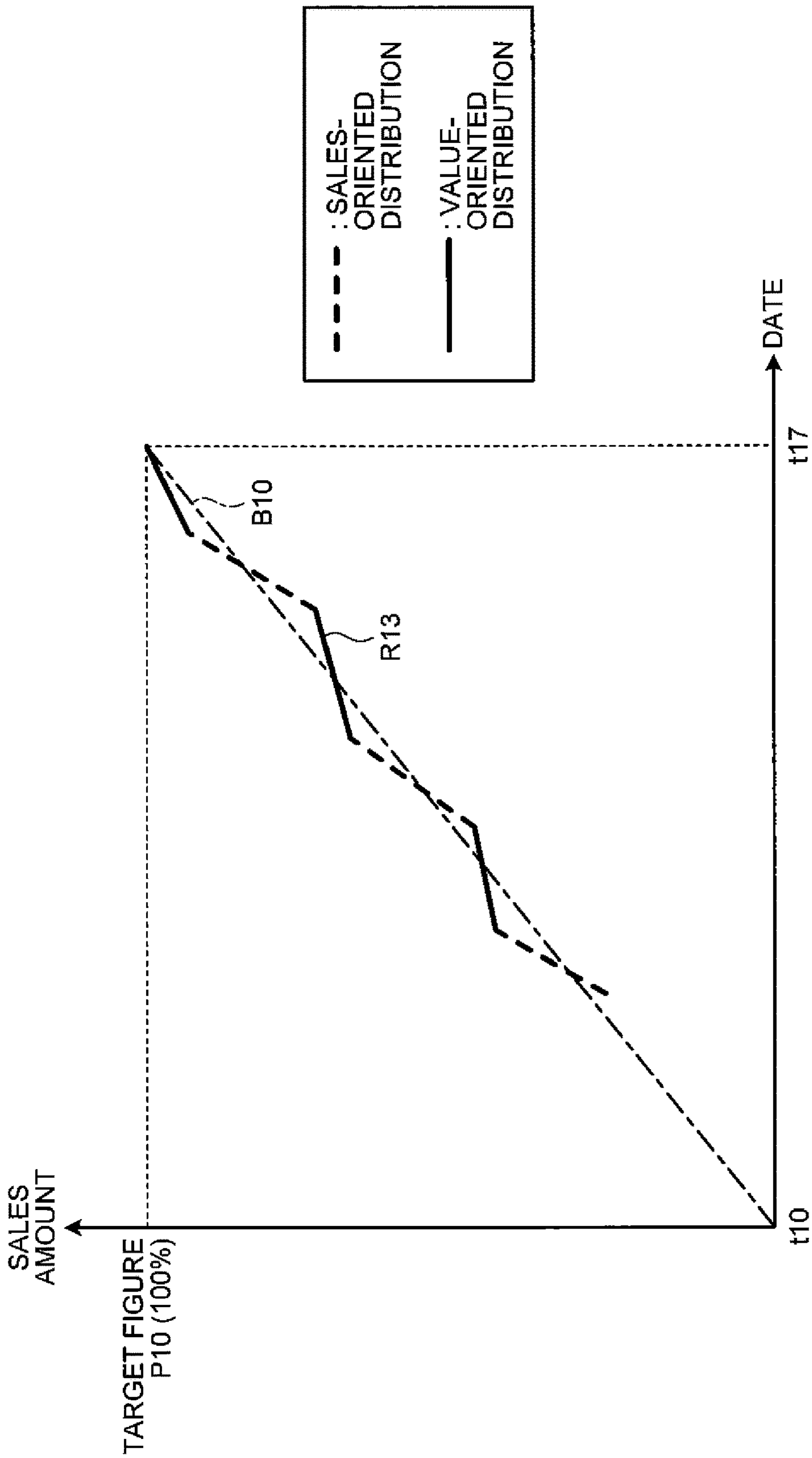
FIG. 10 is a diagram illustrating an example of the advertisement distribution process according to the variation.

The aforementioned embodiment illustrates the example where the advertisement distribution device 100 performs the advertisement distribution process by using the additional target figure line. However, the advertisement distribution device 100 may also perform the advertisement distribution process by using only the target figure line. This point will be described with reference to FIG. 10. FIG. 10 is a diagram illustrating an example of the advertisement distribution process according to the variation.

Similar to the example illustrated in FIG. 1, the advertisement distribution device 100 in the example illustrated in FIG. 10 accepts the target figure P10 from the Web page provider. Here, the calculation unit 132 of the advertisement distribution device 100 calculates the target figure line B10 as with the example illustrated in FIG. 1 but does not calculate an additional target figure line.

In the example illustrated in FIG. 10, the distribution unit 134 periodically acquires the current sales amount stored in the provider information storage unit 122 and compares the acquired current sales amount with a target figure corresponding to the current time point acquired from the target figure line B10. The distribution unit 134 then updates the distribution mode stored in the provider information storage unit 122 to "sales-oriented" when the current sales amount is lower than the target figure by a predetermined first threshold or more. On the other hand, the distribution unit 134 updates the distribution mode stored in the provider information storage unit 122 to "value-oriented" when the current sales amount is higher than the target figure by a predetermined second threshold or more. Note that the distribution unit 134 does not update the distribution mode when the current sales amount is not lower than the target figure by the first threshold or more and not higher than the target figure by the second threshold or more.

Accordingly, the distribution unit 134 performs the aforementioned updating process for each provider ID stored in the provider information storage unit 122. The distribution unit 134 thus switches the advertisement distribution process to either the sales-oriented distribution or the value-oriented distribution such that the advertisement listing fee increases between the target figure line and the additional target figure line that are calculated by the calculation unit 132. That is, the distribution unit 134 switches the distribution mode such that a sales result R13 increases around the target figure line B10 as illustrated in the example in FIG. 10. Note that the advertisement distribution device 100 performs the process of switching the distribution mode during the period from the dates t10 to t17 although there is a section within the dates t10 to t17 where the sales result R13 is not illustrated in FIG. 10.

As a result, the advertisement distribution device 100 can increase both the advertising profit of the Web page provider and the value of the Web page by a simple process while using only the target figure line B10.

6-4. Monitoring Timing

The aforementioned embodiment illustrates the example where the distribution unit 134 performs the distribution mode updating process at the predetermined monitoring timing, as illustrated in FIG. 6. Here, the distribution unit 134 may perform the distribution mode updating process every time a predetermined time elapses or every time the number of times the advertising content is displayed on the Web page (referred to as an "impression count" or the like) increases by a predetermined count.

Specifically, a click count of the advertising content generally varies depending on the time of the day. The click count is considered to increase during time of the day when the access count to a Web page increases (such as commuting and lunch break times) and considered to decrease during time of the day when the access count to a Web page decreases (such as bedtime). Moreover, the click count of the advertising content generally increases with the number of times the advertising content is displayed. As a result, the advertisement listing fee paid to the Web page provider can increase not at a constant pace as time elapses but at a different pace depending on the time of the day.

The distribution unit 134 may therefore perform the distribution mode updating process illustrated in FIG. 6 every time the number of times the advertising content is displayed increases by the predetermined count. This allows the distribution unit 134 to perform the distribution mode updating process at a timing when the advertisement listing fee has changed to some extent. As a result, the distribution unit 134 can avoid performing the distribution mode updating process for a number of times during the time of the day when there is no change in the advertisement listing fee.

6-5. Object to which Distribution Mode is Set

The aforementioned embodiment illustrates the example where the distribution mode is determined for each provider ID (the Web page provider) as illustrated in FIG. 5. However, the provider information storage unit 122 may also store the distribution mode for each Web page. That is, the advertisement distribution device 100 may switch the distribution mode for each Web page even when the Web page is provided by the identical Web page provider. The provider information storage unit 122 may also store the distribution mode for each Web site formed of a group of Web pages. That is, the advertisement distribution device 100 may switch the distribution mode for each Web site such as a news site, an auction site, a weather forecast site, a shopping site, a finance (stock price) site, a route search site, a map providing site, a travel site, and a restaurant profile site even when a Web page is provided by the identical Web page provider.

6-6. Line Shape

The aforementioned embodiment illustrates the target figure line and the additional target figure line each represented by a straight line except for the example illustrated in FIG. 9. However, the calculation unit 132 may also calculate a target figure line and an additional target figure line each represented by a plurality of straight lines, or a target figure line and an additional target figure line each represented by a curve.

6-7. Timing to Switch Distribution Mode

The aforementioned embodiment illustrates the example where the distribution unit 134 switches the distribution mode when the current sales amount is not between the target figure and the additional target figure. However, the distribution unit 134 may also switch the distribution mode at a time point when the same distribution mode has continued for a predetermined period of time or longer. The advertisement distribution device 100 can thus perform both the sales-oriented distribution and the value-oriented distribution by switching the distribution mode at least every predetermined period of time, whereby both the advertising profit of the Web page provider and the value of the Web page can be increased.

6-8. Advertisement Distribution Process

The aforementioned embodiment illustrates the example where the distribution unit 134 preferentially distributes the advertising content with the high bid price when performing the sales-oriented distribution, and preferentially distributes the advertising content having the high degree of correspondence with the keyword included in the Web page or the user attribute when performing the value-oriented distribution. Here, the distribution unit 134 may also perform the advertisement distribution process by combining advertising content distribution processes employing various methods. When performing either the sales-oriented distribution or the value-oriented distribution, the distribution unit 134 may first extract, from the advertising content storage unit 121, a predetermined number of advertising content (such as 1000 or 2000 pieces) in the descending order of the degree of correspondence with the keyword included in the Web page on which the advertising content is displayed (the Web page browsed by the user), for example. Moreover, the distribution unit 134 may first extract, from the advertising content storage unit 121, a predetermined number of advertising content in the descending order of the degree of correspondence with the user attribute, for example. Moreover, the distribution unit 134 may first extract, from the advertising content storage unit 121, a predetermined number of advertising content in the descending order of the degree of correspondence with the search keyword that is input to the search site by the user, for example. Furthermore, when the advertiser specifies a condition for the user attribute to which the advertising content is distributed (referred to as a targeting condition or the like) at the time of submitting the advertising content, the distribution unit 134 may first extract a predetermined number of advertising content in the descending order of the degree of correspondence between the targeting condition and the user attribute, for example.

In the sales-oriented distribution, the distribution unit 134 may then preferentially distribute the advertising content with the high bid price from among the predetermined number of advertising content extracted as illustrated above. In the value-oriented distribution, on the other hand, the distribution unit 134 may preferentially distribute the advertising content having the high degree of correspondence with the keyword included in the Web page, the user attribute, or the search keyword, from among the predetermined number of advertising content extracted as illustrated above.

The aforementioned embodiment illustrates the example where the sales-oriented distribution corresponds to the advertisement distribution using the bid price while the value-oriented distribution corresponds to the advertisement distribution not using the bid price. However, the sales-oriented distribution may correspond to the advertisement distribution using the bid price while the value-oriented distribution may correspond to the advertisement distribution using both the bid price and the CTR. Specifically, the distribution unit 134 may preferentially distribute the advertising content with the high bid price without considering the CTR in the sales-oriented distribution, and preferentially distribute the advertising content having a high multiplication or addition result between the bid price and the CTR in the value-oriented distribution, for example. In this example, the distribution unit 134 preferentially distributes the advertising content that is more likely to be clicked by the user in the value-oriented distribution where not only the bid price but the CTR are considered. The distribution unit 134 can therefore distribute the advertising content having a good impression on the user and increase the value of the Web page as a result. Note that the distribution unit 134 may perform either the sales-oriented distribution using the bid price or the value-oriented distribution using both the bid price and the CTR upon extracting the predetermined number of advertising content (such as 1000 or 2000 pieces) as described in the example above.

6-9. Selection of Target Figure Line

Moreover, the advertisement distribution device 100 in the aforementioned embodiment may calculate a plurality of target figure lines and additional target figure lines, transmit the plurality of target figure lines and additional target figure lines calculated to the advertiser device 20, and allow the advertiser to select which of the target figure lines and the additional target figure lines to be used. The advertisement distribution device 100 may transmit to the advertiser device 20 a piece of information representing the target figure line B10 illustrated in FIG. 1 and the first additional target figure line B21 illustrated in FIG. 8 (such as the graph illustrated in each of FIGS. 1 and 8) and allow the advertiser to select which line to be used, for example.

6-10. Advertisement Listing Fee

The aforementioned embodiment illustrates the example where the bid price corresponds to the unit price of the advertising fee that is charged to the advertiser upon clicking the advertisement. However, the bid price may also correspond to the unit price of the advertising fee that is charged to the advertiser when the advertising content is placed on the Web page.

6-11. Others

Among each of the processes described in the aforementioned embodiment, all or a part of the process described to be performed automatically can be performed manually, or all or a part of the process described to be performed manually can be performed automatically by using a known method. In addition, the procedure, the specific names, and the information including various data and parameters can be changed at will unless otherwise noted.

Moreover, each component of each device is illustrated to provide a functional concept and does not necessarily have to be physically configured as illustrated. That is, a specific mode of breakup/integration of each device is not limited to what is illustrated, whereby the device can be configured by functionally or physically breaking up/integrating all or a part of the device by an arbitrary unit in accordance with various loads or an operating condition.

A part or all of the advertising content storage unit 121 and the provider information storage unit 122 illustrated in FIG. 3 may be held not in the advertisement distribution device 100 but in a storage server or the like, for example. In this case, the advertisement distribution device 100 acquires the advertising content, the provider information, and the like by accessing the storage server. Furthermore, the aforementioned advertisement distribution device 100 may be configured integrally with the information providing device 30 that distributes the Web page, for example.

The aforementioned embodiment illustrates the example where the distribution unit 134 performs the distribution mode updating process and the advertisement distribution process. However, the advertisement distribution device 100 may also include an updating unit which performs the distribution mode updating process. The distribution unit 134 does not perform the distribution mode updating process in this case.

7. Effects

The advertisement distribution device 100 according to the embodiment includes the distribution unit 134 as described above. The distribution unit 134 distributes the advertising content to be placed on the Web page while switching between the advertisement distribution process using the bid price and the advertisement distribution process not using the bid price within the range the advertisement listing fee paid to the Web page provider reaches the predetermined target figure, the Web page provider providing the Web page on which the advertising content is placed.

The advertisement distribution device 100 according to the embodiment can therefore increase both the advertising profit of the Web page provider and the value of the Web page.

Moreover, the calculation unit 132 of the advertisement distribution device 100 according to the embodiment calculates the target figure corresponding to each time point within the target period on the basis of the target figure for the advertisement listing fee in the target period (corresponding to an example of the predetermined period). The distribution unit 134 switches between the advertisement distribution process using the bid price and the advertisement distribution process not using the bid price by comparing the target figure corresponding to the current time point calculated by the calculation unit 132 with the current advertisement listing fee.

The advertisement distribution device 100 according to the embodiment can therefore increase both the advertising profit of the Web page provider and the value of the Web page upon at least allowing the advertisement listing fee to reach the target figure.

Furthermore, the calculation unit 132 of the advertisement distribution device 100 according to the embodiment calculates the additional target figure corresponding to each time point within the target period on the basis of the additional target figure calculated by adding the predetermined value to the target figure. The distribution unit 134 switches the process to the advertisement distribution process using the bid price when the current advertisement listing fee is lower than the target figure corresponding to the current time point, and to the advertisement distribution process not using the bid price when the current advertisement listing fee is higher than the additional target figure corresponding to the current time point.

The advertisement distribution device 100 according to the embodiment can therefore perform the advertisement distribution process which increases the value of the Web page at least within the range the advertisement listing fee reaches the target figure.

Moreover, the calculation unit 132 of the advertisement distribution device 100 according to the embodiment calculates the first additional target figure corresponding to each time point within the target period on the basis of the first additional target figure calculated by adding the first value to the target figure, and calculates the second additional target figure corresponding to each time point within the target period on the basis of the second additional target figure calculated by adding the second value greater than the first value to the target figure. The distribution unit 134 switches the process to the advertisement distribution process using the bid price when the current advertisement listing fee is lower than the first additional target figure corresponding to the current time point, and to the advertisement distribution process not using the bid price when the current advertisement listing fee is higher than the second additional target figure corresponding to the current time point.

The advertisement distribution device 100 according to the embodiment can therefore reduce the load of monitoring by having a longer interval at which the current sales amount is monitored and, at the same time, increase both the advertising profit of the Web page provider and the value of the Web page.

Furthermore, the calculation unit 132 of the advertisement distribution device 100 according to the embodiment calculates, in addition to the target figure corresponding to each time point within the target period, the additional target figure that is higher than the target figure and approaches the target figure as the time approaches the final date of the target period. The distribution unit 134 switches the process to the advertisement distribution process using the bid price when the current advertisement listing fee is lower than the target figure corresponding to the current time point, and to the advertisement distribution process not using the bid price when the current advertisement listing fee is higher than the additional target figure corresponding to the current time point.

The advertisement distribution device 100 according to the embodiment can therefore increase both the advertising profit of the Web page provider and the value of the Web page and, at the same time, prevent the advertisement listing fee from becoming excessively higher than the target figure.

Moreover, the distribution unit 134 of the advertisement distribution device 100 according to the embodiment switches the process to the advertisement distribution process using the bid price when the current advertisement listing fee is lower than the target figure corresponding to the current time point by the predetermined value or more, and to the advertisement distribution process not using the bid price when the current advertisement listing fee is higher than the target figure corresponding to the current time point by the predetermined value or more.

The advertisement distribution device 100 according to the embodiment can therefore increase both the advertising profit of the Web page provider and the value of the Web page by the simple process.

Furthermore, the distribution unit 134 of the advertisement distribution device 100 according to the embodiment performs the process of comparing the target figure corresponding to the current time point with the current advertisement listing fee every time the number of times the advertising content is displayed on the Web page increases by the predetermined count.

The advertisement distribution device 100 according to the embodiment can therefore avoid performing the distribution mode updating process for a number of times during the time of the day when there is no change in the advertisement listing fee.

While some of the embodiments according to the present application have been described in detail with reference to the drawings for illustrative purpose, the present invention can be implemented by the aspects described in the disclosure of the present invention as well as by another embodiment to which various modifications and improvements are applied on the basis of the knowledge of those skilled in the art.

The configuration of the aforementioned advertisement distribution device 100 can be modified flexibly while implementing it by a plurality of server computers or by calling an external platform or the like with the use of an API (Application Programming Interface) or network computing, depending on the function.

Moreover, the term "means" described in claims can be interpreted as a "section," a "module," a "unit," or a "circuit." Acceptance means can be interpreted as an acceptance unit or an acceptance circuit, for example.

One aspect of an embodiment brings the effect that both the profit of the Web page provider and the value of the Web page can be increased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement distribution device communicating over a network with at least one advertiser device and a plurality of terminal devices, the advertisement distribution device comprising:

a memory storing: (i) content information, (ii) a bid price of the content information, (iii) a target value for a listing fee to be paid to a page provider for listing the content information, the target value corresponding to a predetermined time period, and (iv) a current total value; and a processor operatively coupled to the memory, the processor being programmed to:

receive content information and a bid price corresponding to the content information from the at least one advertiser terminal;

in response to receiving the content information, calculate: (i) a first linear target based on multiplying the target value by a ratio of a current point in time over the predetermined time period, (ii) a second linear target based on multiplying a first additional target value, which is determined by increasing the target value by a first predetermined amount, by the ratio of the current point in time over the predetermined time period, and (iii) a third linear target value based on multiplying a second additional target value, which is determined by increasing the target value by a second predetermined amount, by the ratio of the current point in time over the predetermined time period, the second predetermined amount being greater than the first predetermined amount such that the third linear target is greater than the second linear target, which is greater than the first linear target, the first linear target, the second linear target, and the third linear target being linear projections of values over the predetermined time period to be respectively equal to the target value, the first additional target value, and the second additional target value upon completion of the predetermined time period;

distribute stored content information to the plurality of terminal devices over the predetermined time period, the content information being distributed by either a first distribution process or a second distribution process, the first distribution process using only a bid price and the second distribution process using only a multiplication result between the bid price and a CTR (Click Through Rate);

in response to receiving, from the plurality of terminal devices, click notifications indicating that the distributed content information has been clicked, automatically add to the stored current total value a set value of a predetermined ratio of the bid price;

periodically, at predetermined intervals of time, during the predetermined time period while concurrently distributing the stored content information to the plurality of terminal devices, by one of the first distribution process or the second distribution process, compare the stored current total value at the current point in time to: (i) a value of the second linear target at the current point in time, and (ii) a value of the third linear target at the current point in time;

in response to the stored current total value at the current point in time being greater than the value of the calculated third linear target at the current point in time and the content information being distributed by the first distribution process using the bid price, change the distribution process of the content information to be distributed by the second distribution process using the multiplication result between the bid price and the CTR;

in response to the stored current total value at the current point in time being less than the value of the calculated second linear target and greater than the value of the first linear target at the current point in time and the content information being distributed by the second distribution process using the multiplication result between the bid price and the CTR, change the distribution process of the content information to be distributed by the first distribution process using the bid price, such that a possibility that the stored current total value falls below the value of the first linear target value during the predetermined intervals of time is reduced, thereby the predetermined interval of time is set to be longer than when the stored current total value is compared to the value of the first linear target and the value of the third linear target, which reduces load on the processor for monitoring the current total value; and repeatedly distribute stored content information to the plurality of terminal devices over the predetermined time period while changing the distribution process to maintain the current total value between the second linear target and the third linear target, such that after the predetermined time period, the target value is reached.

2. The advertisement distribution device according to claim 1, wherein the processor is programmed to:

calculate a target figure corresponding to each time point within the predetermined period based on the target figure for an advertisement listing fee in the predetermined period; and switch between the first distribution process and the second distribution process by comparing the target figure corresponding to a current time point with a current advertisement listing fee.

3. The advertisement distribution device according to claim 2, wherein the processor is programmed to:

calculate an additional target figure corresponding to each time point within the predetermined period based on an additional target figure calculated by adding a predetermined value to the target figure for the advertisement listing fee in the predetermined period; and switch to the first distribution process when the current advertisement listing fee is lower than the target figure corresponding to the current time point, and switches to the second distribution process when the current advertisement listing fee is higher than an additional target figure corresponding to the current time point.

4. The advertisement distribution device according to claim 2, wherein the processor is programmed to:

calculate a first additional target figure corresponding to each time point within the predetermined period based on a first additional target figure calculated by adding a first value to the target figure, and calculate a second additional target figure corresponding to each time point within the predetermined period based on a second additional target figure calculated by adding a second value greater than the first value to the target figure; and switch to the first distribution process when the current advertisement listing fee is lower than a first additional target figure corresponding to the current time point, and switch to the second distribution process when the current advertisement listing fee is higher than a second additional target figure corresponding to the current time point.

5. The advertisement distribution device according to claim 2, wherein the processor is programmed to:

calculate, in addition to the target figure corresponding to each time point within the predetermined period, an additional target figure that is greater than the target figure and approaches the target figure as time approaches a final date of the predetermined period; and switch to the first distribution process when the current advertisement listing fee is lower than the target figure corresponding to the current time point, and switch to the second distribution process when the current advertisement listing fee is higher than an additional target figure corresponding to the current time point.

6. The advertisement distribution device according to claim 2, wherein the processor is programmed to switch to the first distribution process when the current advertisement listing fee is lower than the target figure corresponding to the current time point by a predetermined value or more, and switch to the second distribution process when the current advertisement listing fee is higher than the target figure corresponding to the current time point by a predetermined value or more.

7. The advertisement distribution device according to claim 1, wherein the processor is programmed to perform the process of switching between the distribution processes every time a number of times the content information is displayed on a web page increases by a predetermined count.

8. An advertisement distribution method performed by an advertisement distribution device, the method comprising:

receiving content information and a bid price corresponding to the content information;

in response to receiving the content information, calculating: (i) a first linear target based on multiplying a target value by a ratio of a current point in time over the predetermined time period, the target value being for a listing fee to be paid to a page provider for listing the content information, the target value corresponding to a predetermined time period, (ii) a second linear target based on multiplying a first additional target value, which is determined by increasing the target value by a first predetermined amount, by the ratio of the current point in time over the predetermined time period, and (iii) a third linear target value based on multiplying a second additional target value, which is determined by increasing the target value by a second predetermined amount, by the ratio of the current point in time over the predetermined time period, the second predetermined amount being greater than the first predetermined amount such that the third linear target is greater than the second linear target, which is greater than the first linear target, the first linear target, the second linear target, and the third linear target being linear projections of values over the predetermined time period to be respectively equal to the target value, the first additional target value, and the second additional target value upon completion of the predetermined time period;

distributing the content information to the plurality of terminal devices over the predetermined time period, the content information being distributed by either a first distribution process or a second distribution process, the first distribution process using only a bid price and the second distribution process using only a multiplication result between the bid price and a CTR (Click Through Rate);

in response to receiving, from the plurality of terminal devices, click notifications indicating that the distributed content information has been clicked, automatically adding to a stored current total value a set value of a predetermined ratio of the bid price;

periodically, at predetermined intervals of time, during the predetermined time period while concurrently distributing the stored content information to the plurality of terminal devices, by one of the first distribution process or the second distribution process, comparing the stored current total value at the current point in time to: (i) a value of the second linear target at the current point in time, and (ii) a value of the third linear target at the current point in time;

in response to the stored current total value at the point in time being greater than the value of the calculated third linear target at the point in time and the content information being distributed by the first distribution process using the bid price, changing the distribution process of the content information to be distributed by the second distribution process using the multiplication result between the bid price and the CTR;

in response to the stored current total value at the point in time being less than the value of the calculated second linear target and greater than the value of the first linear target at the point in time and the content information being distributed by the second distribution process using the multiplication result between the bid price and the CTR, changing the distribution process of the content information to be distributed by the first distribution process using the bid price, such that a possibility that the stored current total value falls below the value of the first linear target value during the predetermined intervals of time is reduced, thereby the predetermined interval of time is set to be longer than when the stored current total value is compared to the value of the first linear target and the value of the third linear target, which reduces load on the processor for monitoring the current total value; and repeatedly distributing stored content information to the plurality of terminal devices over the predetermined time period while changing the distribution process to maintain the current total value between the second linear target and the third linear target, such that after the predetermined time period, the target value is reached.

9. A non-transitory computer-readable storage medium having stored therein an executable advertisement distribution program causing a computer to execute a process, the process comprising:

receiving content information and a bid price corresponding to the content information;

in response to receiving the content information, calculating: (i) a first linear target based on multiplying a target value by a ratio of a current point in time over the predetermined time period, the target value being for a listing fee to be paid to a page provider for listing the content information, the target value corresponding to a predetermined time period, (ii) a second linear target based on multiplying a first additional target value, which is determined by increasing the target value by a first predetermined amount, by the ratio of the current point in time over the predetermined time period, and (iii) a third linear target value based on multiplying a second additional target value, which is determined by increasing the target value by a second predetermined amount, by the ratio of the current point in time over the predetermined time period, the second predetermined amount being greater than the first predetermined amount such that the third linear target is greater than the second linear target, which is greater than the first linear target, the first linear target, the second linear target, and the third linear target being linear projections of values over the predetermined time period to be respectively equal to the target value, the first additional target value, and the second additional target value upon completion of the predetermined time period;

distributing the content information to the plurality of terminal devices over the predetermined time period, the content information being distributed by either a first distribution process or a second distribution process, the first distribution process using only a bid price and the second distribution process using only a multiplication result between the bid price and a CTR (Click Through Rate);

in response to receiving, from the plurality of terminal devices, click notifications indicating that the distributed content information has been clicked, automatically adding to a stored current total value a set value of a predetermined ratio of the bid price;

periodically, at predetermined intervals of time, during the predetermined time period while concurrently distributing the stored content information to the plurality of terminal devices, by one of the first distribution process or the second distribution process, comparing the stored current total value at a current point in time to: (i) a value of the second linear target at the current point in time, and (ii) a value of the third linear target at the current point in time;

in response to the stored current total value at the point in time being greater than the value of the calculated third linear target at the point in time and the content information being distributed by the first distribution process using the bid price, changing the distribution process of the content information to be distributed by the second distribution process using the multiplication result between the bid price and the CTR;

in response to the stored current total value at the point in time being less than the value of the calculated second linear target and greater than the value of the first linear target at the point in time and the content information being distributed by the second distribution process using the multiplication result between the bid price and the CTR, changing the distribution process of the content information to be distributed by the first distribution process using the bid price, such that a possibility that the stored current total value falls below the value of the first linear target value during the predetermined intervals of time is reduced, thereby the predetermined interval of time is set to be longer than when the stored current total value is compared to the value of the first linear target and the value of the third linear target, which reduces load on the processor for monitoring the current total value; and repeatedly distributing stored content information to the plurality of terminal devices over the predetermined time period while changing the distribution process to maintain the current total value between the second linear target and the third linear target, such that after the predetermined time period, the target value is reached.

* * * * *